United States Patent
Chien et al.

(10) Patent No.: US 9,898,052 B2
(45) Date of Patent: Feb. 20, 2018

(54) POSITIONING STRUCTURE FOR TOUCH DISPLAY DEVICE AND TOUCH DISPLAY DEVICE

(71) Applicant: WISTRON CORPORATION, Taipei Hsien (TW)

(72) Inventors: Shih-Che Chien, Taipei Hsien (TW); Po-Liang Huang, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 293 days.

(21) Appl. No.: 13/836,658

(22) Filed: Mar. 15, 2013

(65) Prior Publication Data
US 2014/0168533 A1  Jun. 19, 2014

(30) Foreign Application Priority Data
Dec. 18, 2012  (TW) .............................. 101148183 A

(51) Int. Cl.
G06F 1/16 (2006.01)
G06F 3/042 (2006.01)
G02F 1/29 (2006.01)

(52) U.S. Cl.
CPC ............ *G06F 1/169* (2013.01); *G06F 1/1643* (2013.01); *G06F 1/1656* (2013.01)

(58) Field of Classification Search
CPC ....................................................... G06F 3/042
See application file for complete search history.

(56) References Cited

U.S. PATENT DOCUMENTS

| 4,113,162 A | * | 9/1978 | Boehm | ................... C03B 33/09 |
| | | | | 225/2 |
| 4,134,238 A | * | 1/1979 | Auger | .................. E06B 3/5409 |
| | | | | 206/453 |

(Continued)

FOREIGN PATENT DOCUMENTS

| CN | 202049467 U | * | 11/2011 | ............. G06F 3/042 |
| CN | 202257518 | * | 5/2012 | ............. G06F 3/042 |

(Continued)

OTHER PUBLICATIONS

Communication From the Taiwan Patent Office Regarding a Counterpart Foreign Application dated (Taiwan Year 103) Oct. 27, 2014.

(Continued)

*Primary Examiner* — Edward Glick
*Assistant Examiner* — Anthony G Quash
(74) *Attorney, Agent, or Firm* — Rosenberg, Klein & Lee

(57) ABSTRACT

The present disclosure relates to a positioning structure for touch display device and a touch display device. The touch display device comprises a touch glass, at least a positioning structure, and at least an optomechanical module. The positioning structure is used for positioning the optomechanical module to the touch glass. The positioning structure has at least a positioning member, which has a fixing part and a clamping part. The fixing part is clamped to the touch glass; the clamping part is provided for disposing the optomechanical module. The positioning structure according to the present disclosure allows direct assembly of the optomechanical module. In the assembling process, no other jointing means is required. Thereby, assembling easiness and speed can be well improved.

9 Claims, 9 Drawing Sheets

(56) References Cited

U.S. PATENT DOCUMENTS

| | | | |
|---|---|---|---|
| 8,235,343 B2* | 8/2012 | Tseng | 248/298.1 |
| 9,213,443 B2* | 12/2015 | Goertz | G06F 3/0421 |
| 2010/0085330 A1* | 4/2010 | Newton | G06F 3/0428 |
| | | | 345/175 |
| 2011/0243018 A1* | 10/2011 | Prasad | H04W 72/085 |
| | | | 370/252 |
| 2013/0100084 A1* | 4/2013 | Son | G06F 3/0428 |
| | | | 345/175 |
| 2013/0128179 A1* | 5/2013 | Yu | 349/58 |

FOREIGN PATENT DOCUMENTS

| | | | | |
|---|---|---|---|---|
| CN | 202257518 U | | 5/2012 | |
| JP | 56-101126 | * | 8/1981 | G02F 1/133 |
| TW | M421512 | * | 1/2012 | G02F 1/1333 |
| TW | M421512 U | | 1/2012 | |

OTHER PUBLICATIONS

Communication From the Chinese Patent Office Regarding a Counterpart Foreign Application dated Apr. 5, 2016.

* cited by examiner

POSITIONING STRUCTURE FOR TOUCH DISPLAY DEVICE AND TOUCH DISPLAY DEVICE

FIELD OF THE DISCLOSURE

The present disclosure relates generally to a positioning structure and a display device, and particularly to a positioning structure for touch display device, which positions an optomechanical module to a touch glass, and a touch display device.

BACKGROUND OF THE DISCLOSURE

In modern information times, people rely on electronic products increasingly. Handheld electronic devices, such as mobile phones, handheld computers, personal digital assistants, or smartphones, are popular in our daily lives. For achieving the purposes of more convenience, compactness in size, and more friendliness, the input device of many information products has transformed from traditional keyboard or mouse to touch panel. Touch panels can be assembled to various types of flat-panel displays and forming touch display devices having the functions of displaying and inputting concurrently.

Depending on the detecting methods, touch panels are divided into resistive, capacitive, electromagnetic, optical, or surface acoustic types. Optical touch panels mainly have an optomechanical module at the corner of a touch glass. The optomechanical module includes a transmitter and a receiver. It uses the receiver to receive the infrared transmitted by the transmitter. Then the receiver identifies if the optical path is interrupted for judging whether a user is operating the touch panel.

Presently, the optomechanical module is mostly fixed to the touch glass by gluing. Nonetheless, during the process of drying the glue, the optomechanical is prone to displacement due to glue flow or vibration of the touch panel. For improving the displacement problem of the optomechanical module on the touch glass, a positioning frame is disposed on the touch glass and the optomechanical module is fixed to the positioning frame by gluing yet. Although the displacement problem of the optomechanical module on the touch glass is improved, it still take a long waiting time for gluing the optomechanical module to the positioning frame and thus reducing drastically the assembly speed. In addition, for disassembling the optomechanical module from the positioning frame, destructive disassembly is required, which may damage the optomechanical module.

For solving the problems described above, the present disclosure provides a positioning structure for touch display device and a touch display device. The positioning stricture is disposed on the touch glass. The optomechanical module is assembled to the positioning structure on the touch glass for positioning to the touch glass. Thereby, assembling and disassembling can be done with ease. The speed of assembling and disassembling can be enhanced as well. Besides, damages in the touch glass can be avoided.

SUMMARY

An objective of the present disclosure is to provide a positioning structure for touch display device and a touch display device. The optomechanical module of the touch display device is positioned to the touch glass via the positioning structure. The optomechanical module is assembled to the positioning structure directly. No other jointing means is required in the assembling process. Thereby, assembling easiness and speed can be well improved.

Another objective of the present disclosure is to provide a positioning structure for touch display device and a touch display device. The optomechanical module of the touch display device is assembled to the positioning structure by clamping. Thereby, no destructive disassembly is required for disassembling the optomechanical module from the positioning structure on the touch glass. Consequently, assembling easiness and speed can be well improved. Besides, damages in the touch glass or the optomechanical module can be avoided.

The present disclosure provides a positioning structure for touch display device, which positions an optomechanical module to a touch glass. The positioning structure comprises two positioning members, each having a fixing part and a clamping part. The clamping part is connected to the fixing part. The two positioning members are disposed symmetrically to the touch glass. The clamping parts are opposite to each other and forming an accommodating space. The accommodating space is provided for disposing the optomechanical module.

The present disclosure further provides a positioning structure for touch display device, which positions an optomechanical module to a touch glass. The positioning structure comprises a positioning member having a fixing part and a clamping part. The clamping part is connected to the fixing part. The fixing part is disposed to the touch glass. The optomechanical module is disposed to the clamping part.

The present disclosure further provides a touch display device, which comprises a touch glass, at least a positioning structure, and at least an optomechanical module. The positioning structure is disposed on the touch glass. The optomechanical module is disposed to the positioning structure, which positions the optomechanical module to the touch glass. The positioning structure comprises two positioning members, each having a fixing part and a clamping part. The clamping part is connected to the fixing part. The two positioning members are disposed symmetrically to the touch glass. The clamping parts are opposite to each other and forming an accommodating space. The accommodating space is provided for disposing the optomechanical module.

DETAILED DESCRIPTION

In order to make the structure and characteristics as well as the effectiveness of the present disclosure to be further understood and recognized, the detailed description of the present disclosure is provided as follows along with embodiments and accompanying figures.

According to the prior art, an optomechanical device used in a touch display device is fixed to a touch glass by gluing. Consequently, the optomechanical module is prone to displacement during the waiting process of gluing. The time for gluing is very long, and thus reducing the speed of assembling the optomechanical module to the touch glass. In addition, destructive disassembly is required for disassembling the optomechanical module from the touch glass, which may damage the touch glass or the optomechanical module and disallow reuse of the touch glass or the optomechanical module. Accordingly, the present disclosure provides a positioning structure for the optomechanical module and a touch display device. The optomechanical module in the touch display device is assembled directly to the positioning structure on the touch glass by clamping. No other jointing means is required in the assembling process. Thereby, the problems of displacement, reduced assembling speed, and damages in the touch glass or the optomechanical module while disassembling the optomechanical module can be solved.

Figure 1:
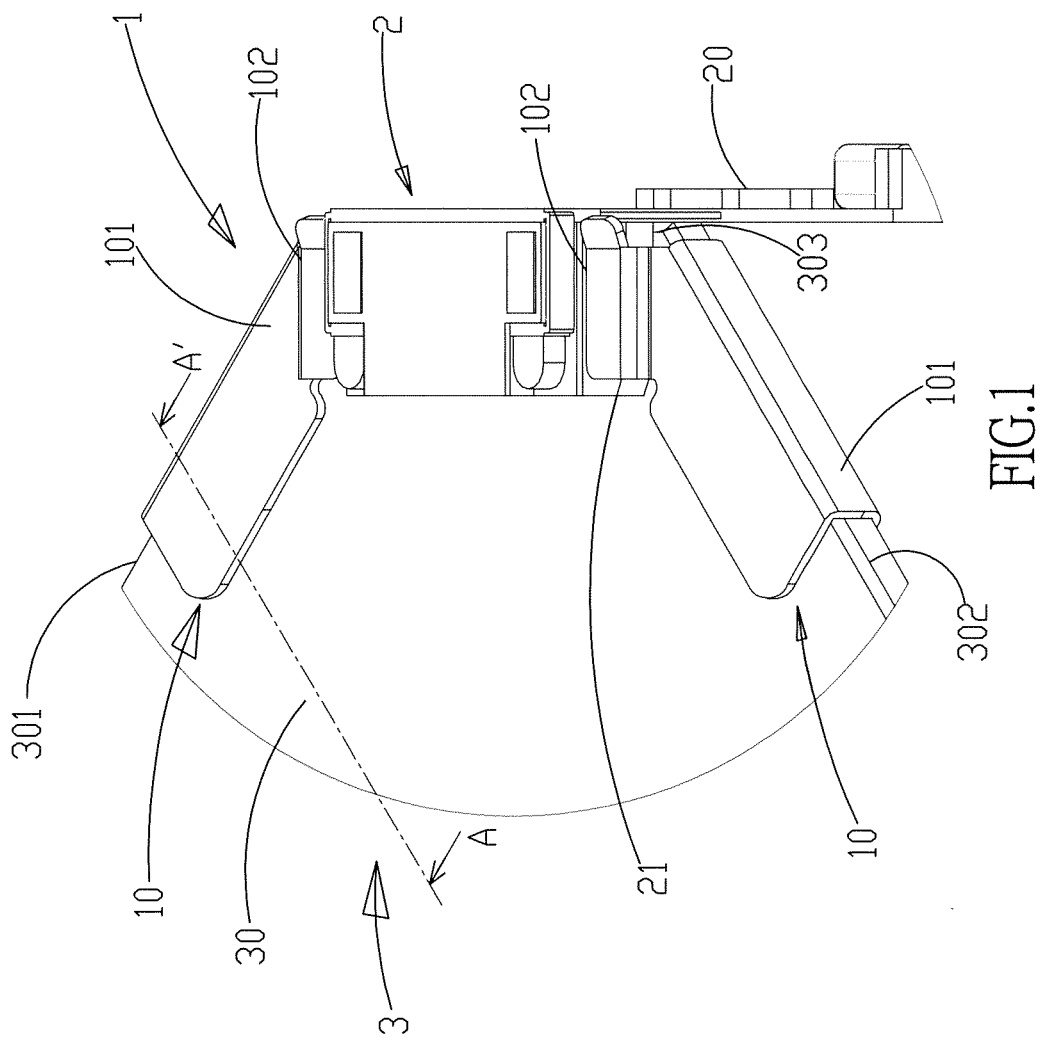
FIG. 1 shows a schematic diagram of the touch display device according to the first embodiment of the present disclosure.
Figure 2:
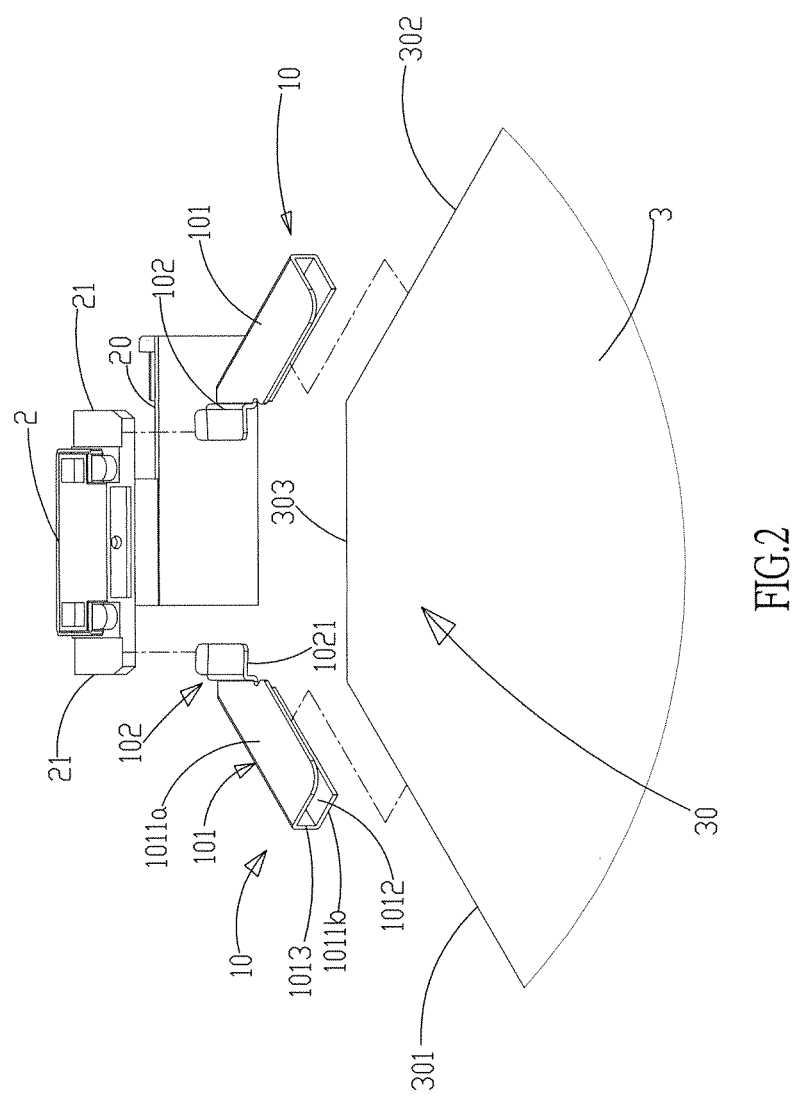
FIG. 2 shows an assembly diagram of the touch display device according to the first embodiment of the present disclosure.
Figure 3:
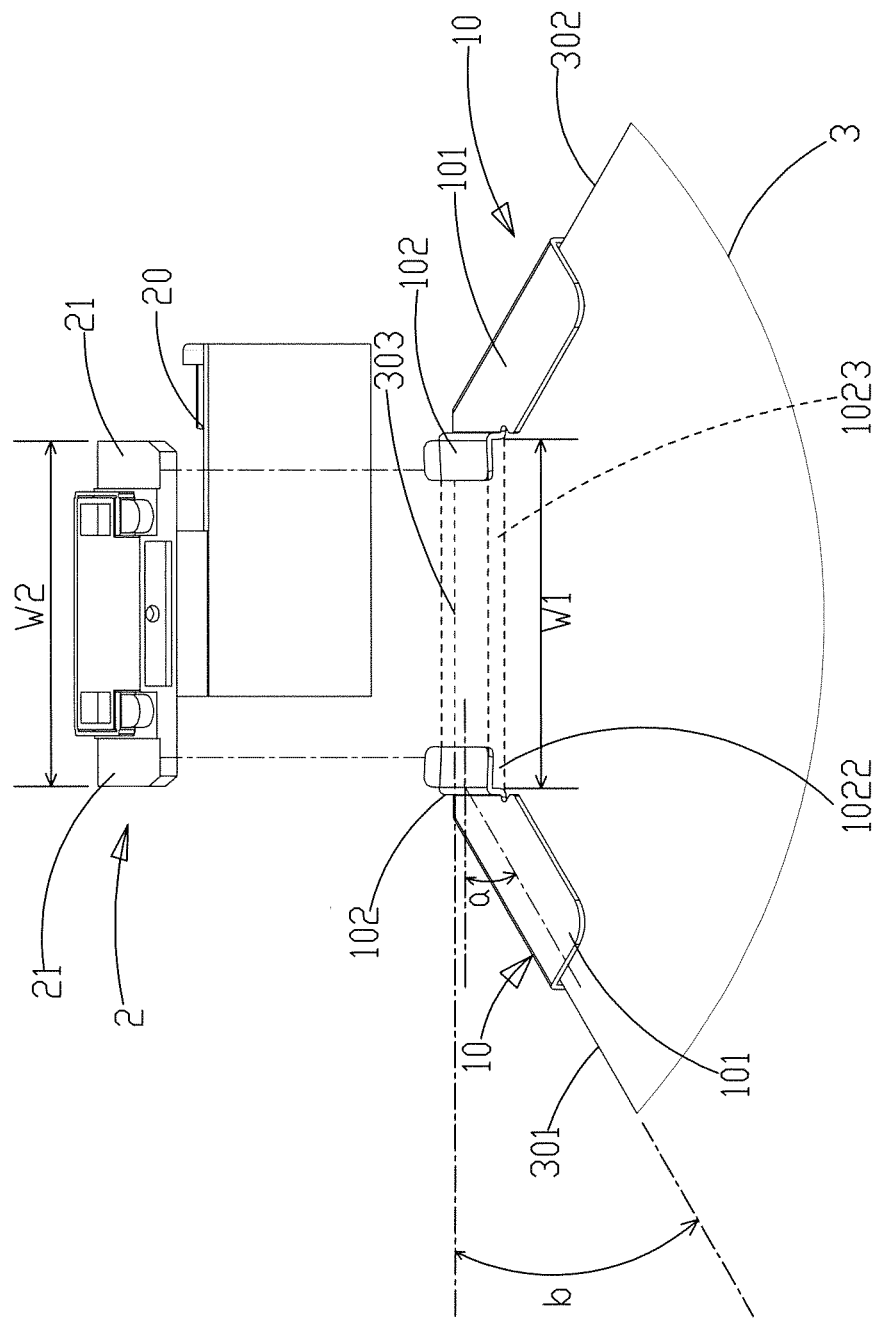
FIG. 3 shows another assembly diagram of the touch display device according to the first embodiment of the present disclosure.

FIGS. 1 to 3 show a schematic diagram and assembly diagrams of the touch display device according to the first embodiment of the present disclosure. As shown in the figures, the present embodiment provides a touch display device, which usually has a touch module and a display module. The display module can be flat-panel display, a flat TV, or an electronic white board. The touch display device according to the present embodiment comprises at least a positioning structure 1, at least an optomechanical module 2, and a touch glass 3. The positioning structure 1 is used for positioning the optomechanical module 2 to the touch glass 3 for forming the touch module. The positioning structure 1 according to the present embodiment comprises two positioning members 10 disposed at a corner 30 of the touch glass 3. The corner 30 has a first side 301, a second side 302, and a third side 303. The first side 301 extends from one end of the third side 303, while the second side 302 extends from the other end of the third side 303. The extending direction of the first side 301 departs from that of the second side 302 and thus forming a cut angle at the corner 30.

One of the positioning members 10 is disposed on the first side 301 while the other positioning member 10 is disposed on the second side 302. The optomechanical module 2 is assembled to the two positioning member 10, which match tightly the optomechanical module 2 for positioning the optomechanical module 2 to the corner 30 of the touch glass 3. One side of the optomechanical module 2 is next to the third side 303, so that the circuit 20 thereof can hang down along the third side 303 but not on the touch glass 3 and affecting the overall aesthetics.

Besides, each positioning member 10 has a fixing part 101 and a clamping part 102. Because the two positioning members 10 own identical structures, the one located on the first side 301 of the touch glass 3 is used for description. The fixing part 101 clamps to the first side 301 of the touch glass 3. The optomechanical module 2 is installed to the clamping part 102. The fixing part 101 has a first fixing sheet 1011a and a second fixing sheet 1011b. One end of the first fixing sheet 1011a and the second fixing sheet 1011b are disposed in parallel and spaced apart. One end of the first fixing sheet 1011a is connected with one end of the second fixing sheet 1011b and forming a fixing space 1012 between the first fixing sheet 1011a and the second fixing sheet 1011b. There is a fixing opening 1013 between the first fixing sheet 1011a and the second fixing sheet 1011b and communicating with the fixing space 1012.

The clamping part 102 is connected to one side of the first fixing sheet 1011a. The clamping part 102 has a clamping sheet 1021. One end of the clamping sheet 1021 is connected to one side of the first fixing sheet 1011a and the other end thereof extends towards the outside of the first fixing sheet 1011a, namely, in the direction away from the first fixing sheet 1011a. The clamping sheet 1021 and the first fixing sheet 1011a are ladder shaped, which means that the clamping sheet 1021 and the first fixing sheet 1011a are not on the same level. There is a difference in height and hence forming a clamping groove 1022 for disposing the optomechanical module 2. In addition, there is an angle a between the clamping part 102 and the fixing part 101. This angle a is identical to the angle b between the first side 301 and the third side 303. When the optomechanical module 2 is disposed in the clamping part 102, one side of the optomechanical module 2 is next to and parallel with the third side 303.

Figure 4:
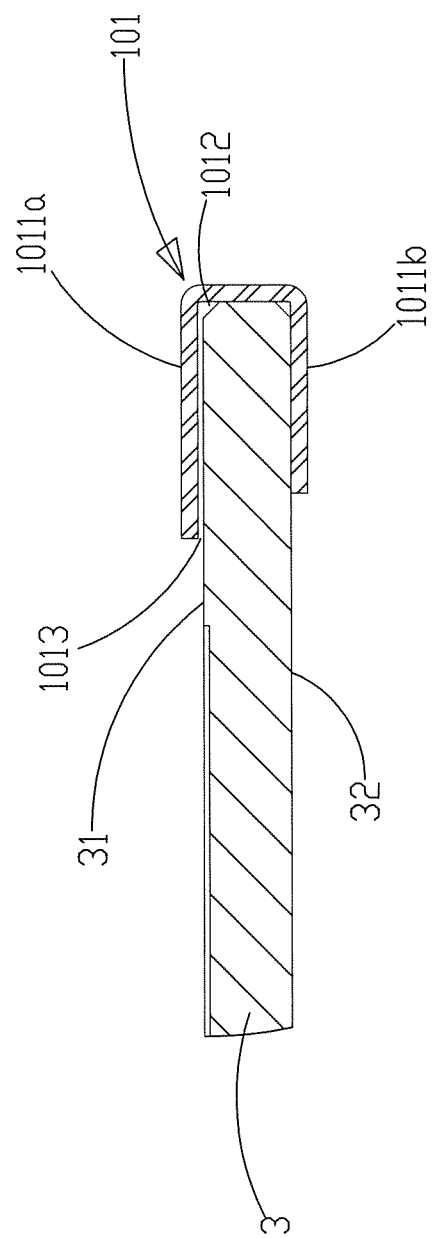
FIG. 4 shows a cross-sectional view along the AA' direction in FIG. 1 according to the present disclosure.

Refer again to FIG. 1. The two positioning members 10 are disposed symmetrically on the first side 301 and the second side 302 of the touch glass 3. The touch glass 3 enters the fixing space 1012 from the fixing opening 1013 of the fixing part 101 of each positioning member 10 so that the fixing part 101 of each positioning member 10 slips on the first side 301 or the second side 302 of the touch glass 3. FIG. 4 shows a cross-sectional view along the AA' direction in FIG. 1 according to the present disclosure. As shown in the figure, when the fixing part 101 slips on the touch glass 3, the first fixing sheet 1011a according to the present embodiment presses a first surface 31, which is a touch surface, of the touch glass 3, and the second fixing sheet 1011b presses a second surface 32 of the touch glass 3. The second surface 32 is opposite to the first surface 31. Besides, because the first fixing sheet 1011a of the fixing part 101 is connected with the clamping part 102 and the first fixing sheet 1011a presses the first surface 31 of the touch glass 3, the clamping part 102 is located above the first surface 31.

Because the two positioning members 10 are disposed symmetrically on the touch glass 3 and the two clamping parts 102 are opposite to each other, the two clamping grooves 1022 communicate with each other and form an accommodating space 1023. The optomechanical module 2 has two wing parts 21. When the optomechanical module 2 is assembled to the positioning structure 1, the two wing parts 21 of the optomechanical module 2 are clamped in the two clamping grooves 1022 of the two positioning members 10, respectively, for locating the optomechanical module 2 in the accommodating space 1023. The width W1 of the accommodating space 1023 must be equal to the width W2 of the optomechanical module 2 for tightly matching the optomechanical module 2 to the two clamping grooves 1022 of the two positioning members 10. Thereby, the optomechanical module 2 is positioned to the first surface 31 of the touch glass 3.

It is known from the above that the present embodiment uses the clamping method to assemble the optomechanical module 2 to the positioning structure 1 located on the touch glass 3. Thereby, the easiness and the speed for assembling the optomechanical module 2 to the touch glass 3 can be enhanced. Moreover, it is easy to assemble the optomechanical module 2 according to the present embodiment to the positioning structure 1 and disassemble the optomechanical module 2 from the positioning structure 1. During the disassembling process, no destructive disassembly is required. Thereby, the optomechanical module 2 or the touch glass 3 will not be damaged in the disassembling process. Hence, the optomechanical module 2 or the touch glass can be reused. The positioning structure 1 according to the present embodiment uses two positioning members 10 to match the optomechanical module 2 tightly, so that the optomechanical module 2 can be fixed to the touch glass 3 firmly; the displacement problem will hardly happen.

Figure 5:
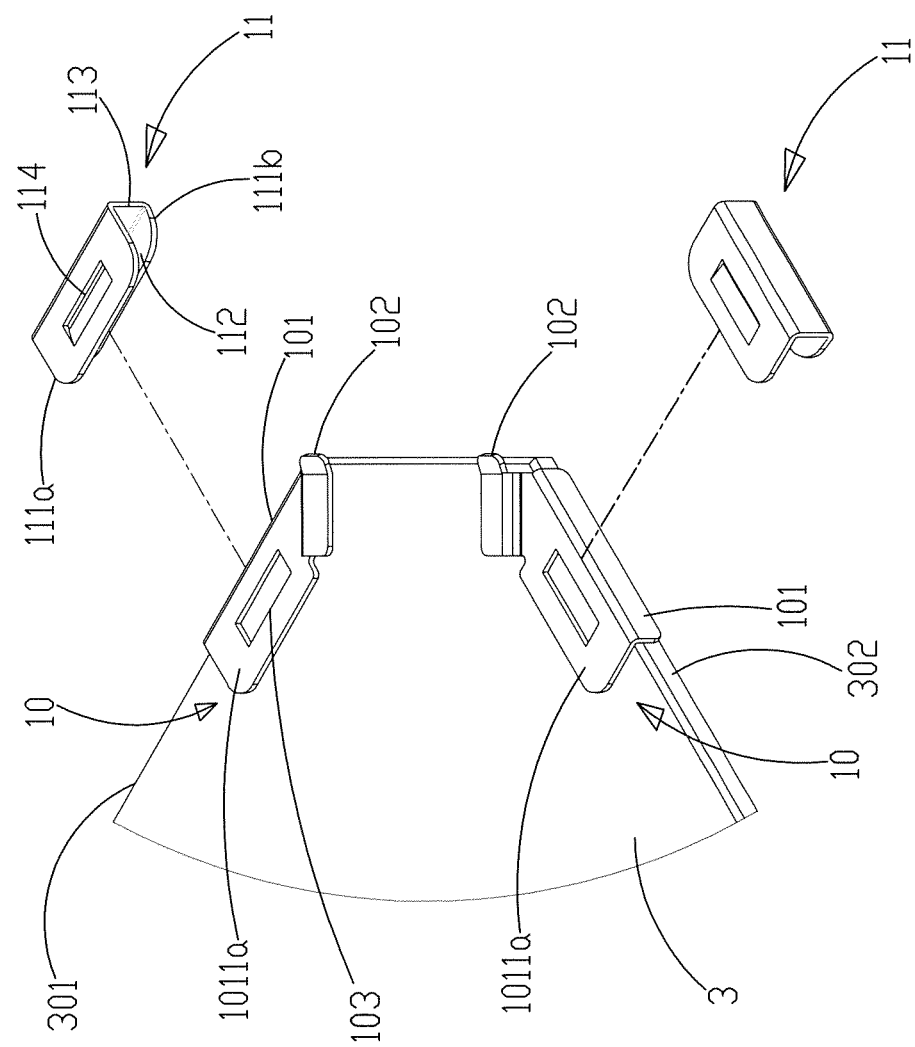
FIG. 5 shows an assembly diagram of the touch display device according to the second embodiment of the present disclosure.

FIG. 5 shows an assembly diagram of the touch display device according to the second embodiment of the present disclosure. As shown in the figure, the positioning structure 1 according to the present embodiment further comprises two clipping members 11, each having a first clipping sheet 111a and a second clipping sheet 111b. One end of the first clipping sheet 111a is connected with one end of the second clipping sheet 111b. The first clipping sheet 111a and the second clipping sheet 111b are parallel and spaced apart and thus forming a clipping space 112 therebetween. There is a clipping opening 113 between the first clipping sheet 111a and the second clipping sheet 111b and communicating with the clipping space 112.

Figure 6:
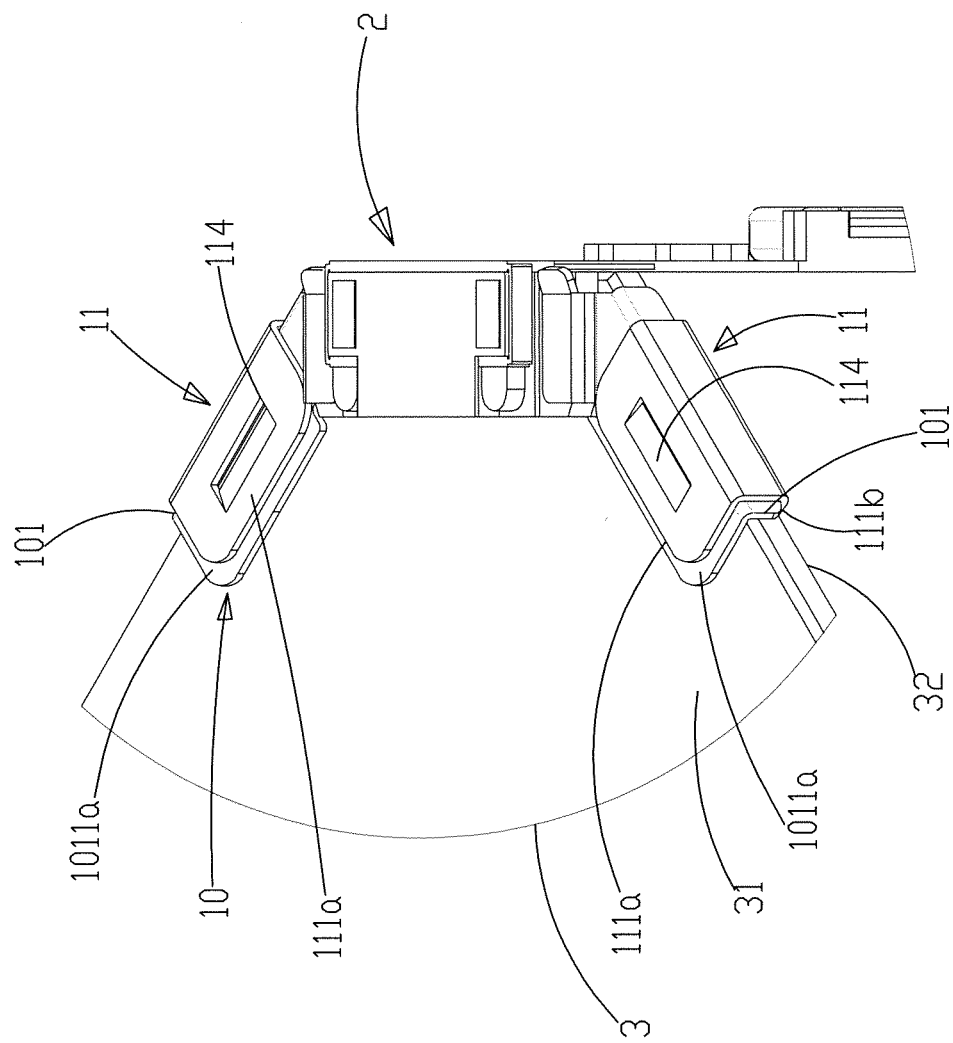
FIG. 6 shows a schematic diagram of the touch display device according to the second embodiment of the present disclosure.

FIG. 6 shows a schematic diagram of the touch display device according to the second embodiment of the present disclosure. As shown in the figure, when the clipping member 11 is disposed at the fixing part 101 of the positioning member 10, the fixing part 101 enters from the clipping opening 113. By keeping pushing the clipping member 11, the fixing part 101 will enter the clipping space 112. Then the first clipping sheet 111a and the second clipping sheet 111b will clip the fixing part 101 for preventing displacement of the positioning member 10 on the touch glass 3 and thereby improving the stability of the positioning structure 1 positioning the optomechanical module 2. Because the clipping member 11 is used for fixing and clipping the fixing part 101 of the positioning member 10, the fixing part 101 according to the present embodiment omits disposition of the second fixing sheet 1011a.

The first clipping sheet 111a according to the present embodiment is located on the first fixing sheet 1011a; the second clipping sheet 111b is located on the second surface of the touch glass 3. The first fixing sheet 1011a further has a first buckle part 103; the first clipping sheet 111a has a second buckle part 114. When the clipping member 11 clips the fixing part 101 of the positioning member 10, the first buckle part 103 and the second buckle part 114 buckle to each other. Thereby, the situation of the clipping member 11 coming off the positioning member 10 can be avoided effectively and thus maintaining the stability of the positioning structure 1 positioning the optomechanical module 2. The first buckle part 103 according to the present embodiment is a hole, while the second buckle part 114 is a hook member. When the second buckle part 114 is disposed to the first buckle part 103, the hook member buckles to the hole. Of course, the first buckle part 103 and the second buckle part 114 can be other types if they can buckle to each other. The details will not be described here.

Figure 7:
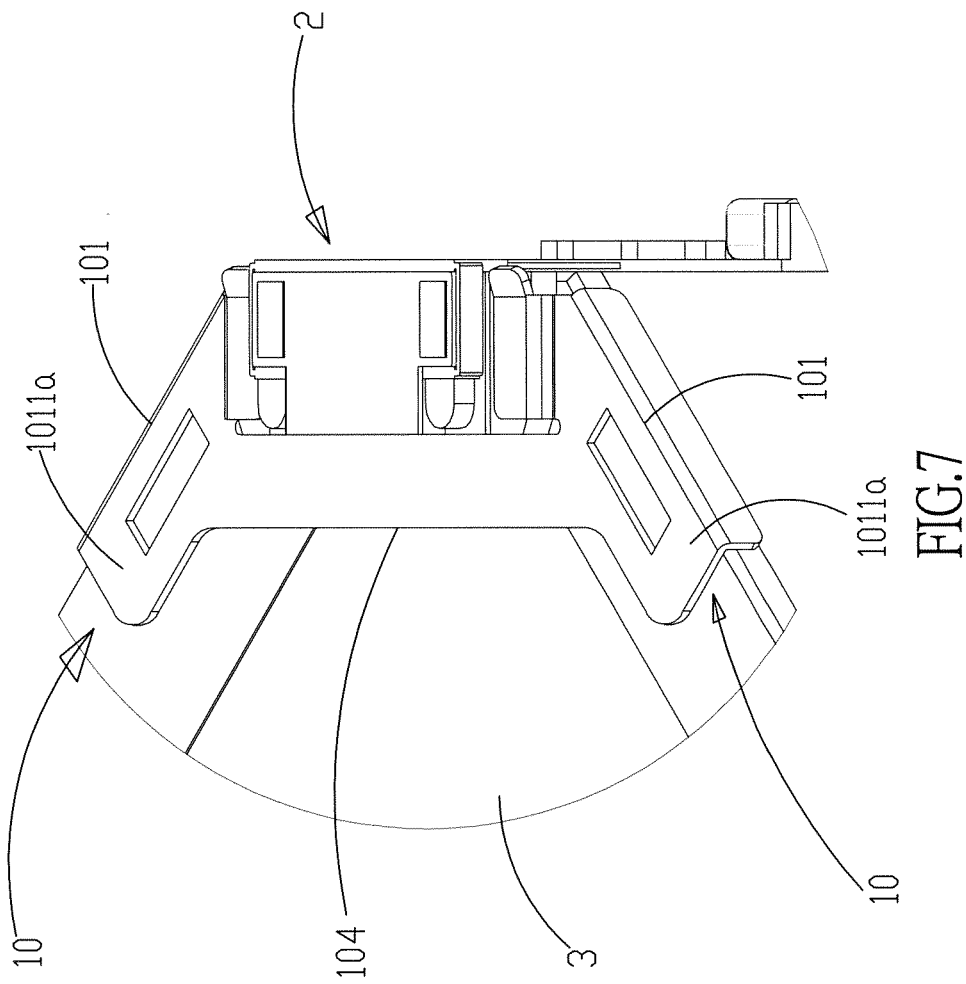
FIG. 7 shows a schematic diagram of the touch display device according to the third embodiment of the present disclosure.

FIG. 7 shows a schematic diagram of the touch display device according to the third embodiment of the present disclosure. As shown in the figure, the positioning structure 1 according to the present embodiment further comprises a connecting sheet 104 connecting the two first fixing sheets 1011a of the two fixing parts 101 of the two positioning members 10 so that the distance between the two positioning members 10 can match the optomechanical module closely. Besides, the connecting sheet 104 and the two fixing parts 101 are formed integrally. In the positioning structure 1, the two positioning members 10 are connected by the connecting sheet 104. Thereby, the positioning structure 1 can be disposed on the touch glass directly; no subsequent adjustment is required after disposition for matching the two positioning members 10 to the optomechanical module 2 tightly and disposing the optomechanical module 2 firmly on the touch glass 3. The positioning structure 1 fixes the two positioning members 10 to the touch glass 3 firmly via the connecting sheet 104 and avoids the two positioning members 10 coming off or shifting from the touch glass 3, which will disallow the optomechanical module 2 to be assembled to the positioning structure 1. The connecting sheet 104 according to the present embodiment connects the two first fixing sheets 1011a of the two fixing parts 101 of the two positioning members 10. Of course, the connecting sheet 104 according to the present embodiment can also connect the two second fixing sheets 1011b of the two fixing parts 101 of the two positioning members 10. The details will not be described here.

Figure 8:
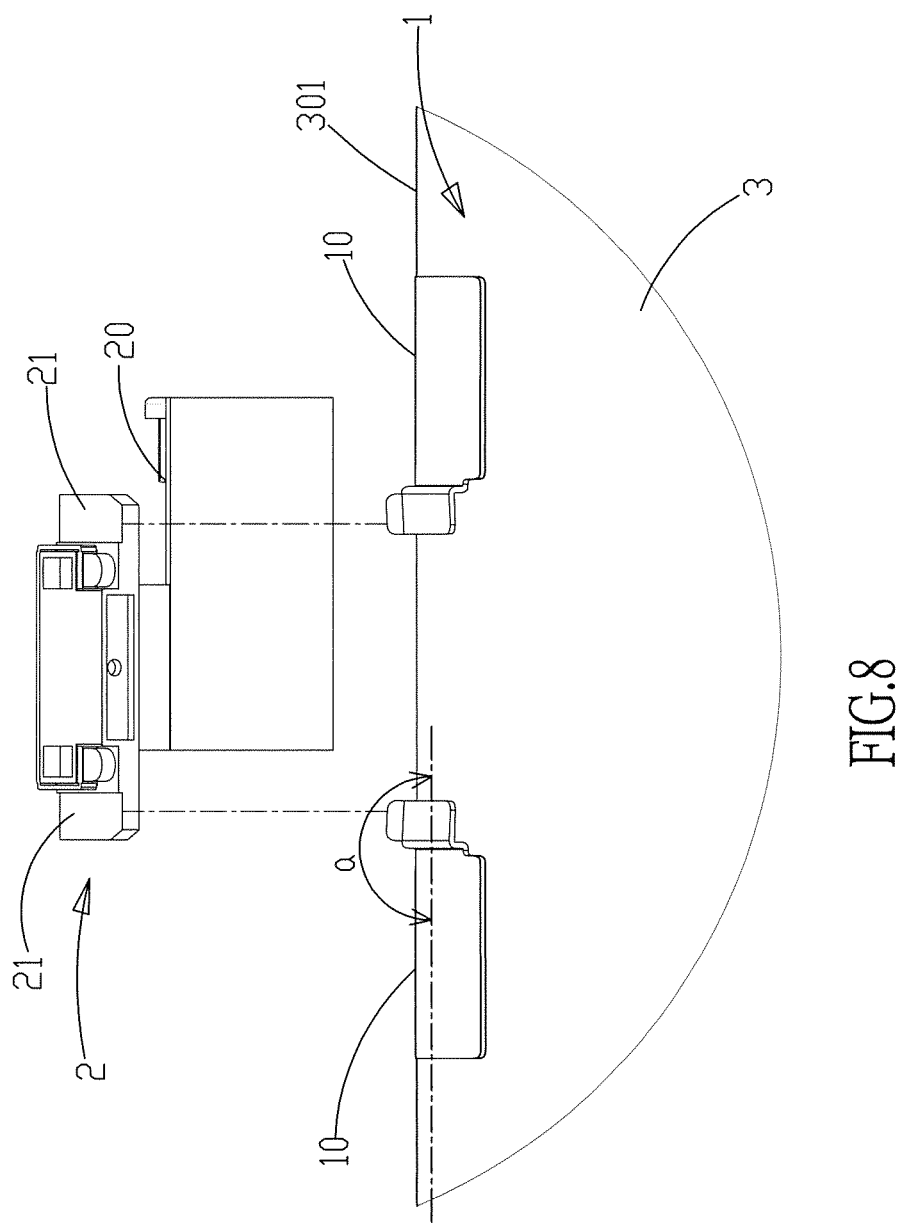
FIG. 8 shows a schematic diagram of the touch display device according to the fourth embodiment of the present disclosure.
Figure 9:
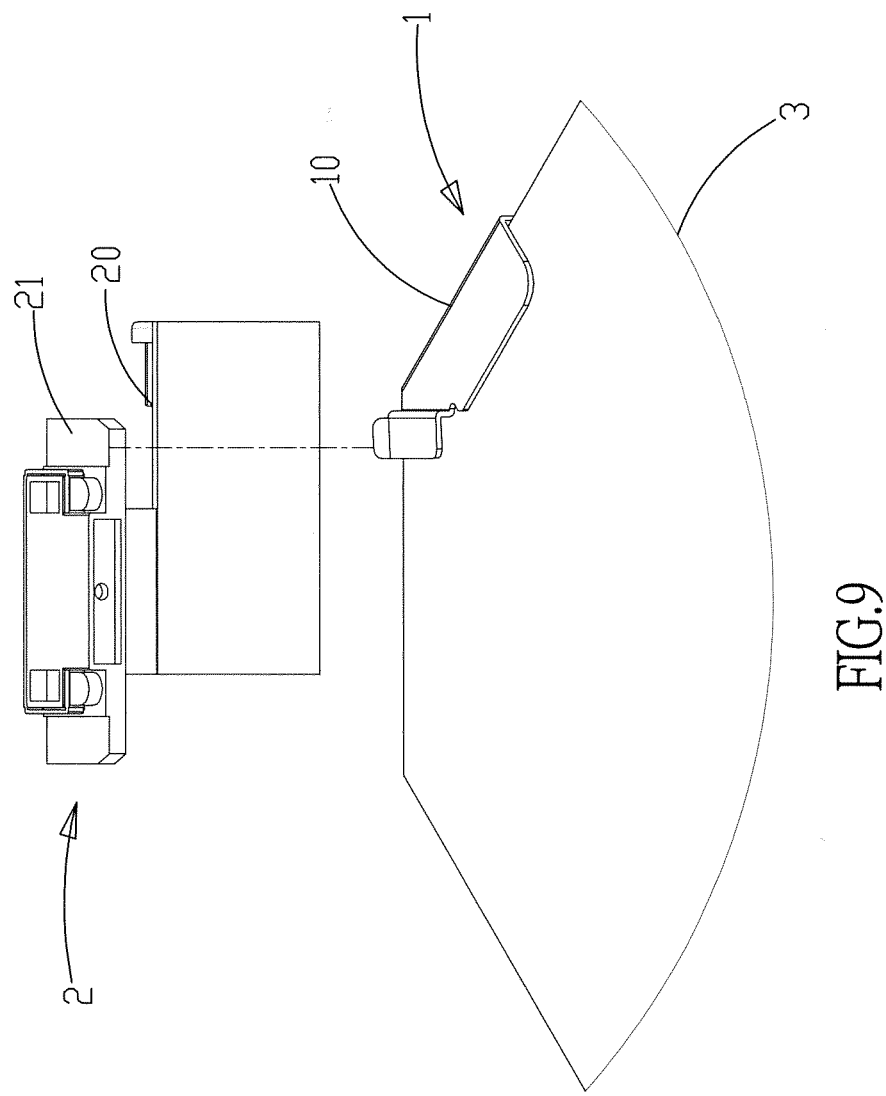
FIG. 9 shows a schematic diagram of the touch display device according to the fifth embodiment of the present disclosure.

FIG. 8 shows a schematic diagram of the touch display device according to the fourth embodiment of the present disclosure. As shown in the figure, the positioning structure 1 according to the previous embodiments is disposed at the corner 30 of the touch glass 3. In the present embodiment, the positioning structure 1 is disposed on the first side 301 of the touch glass 3. In other words, the two positioning members 10 are disposed symmetrically on the first side 301 of the touch glass 3. The difference between the positioning member 10 according to the present embodiment form the one according to the previous embodiment is that when the two positioning members 10 are disposed on the first side 301 of the touch glass 3, the angle a between the fixing part 101 and the clamping part 102 of the positioning member 10 is changed to 180 degrees, so that one side of the optomechanical module 2 can be next to the first side 301 of the touch glass 3. Except the change in the angle between the fixing part 101 and the clamping part 102, the rest are the same as in the previous embodiment. The details will not be described again. The positioning structure 1 according to the embodiments described above all adopt two positioning members 10. Referring to FIG. 9, one of the positioning members 10 can be omitted while achieving the effect of positioning the optomechanical module 2 to the touch glass 3. The details will not be described here.

To sum up, the present disclosure relates to a positioning structure for touch display device and a touch display device. The touch display device according to the present disclosure at least comprises a touch glass, a positioning structure, an optomechanical module. The positioning structure is disposed to the touch glass; the optomechanical module is assemble to and positioned on the positioning stricture directly. Thus, the displacement problem in gluing the optomechanical module to the touch glass according to the prior art can be solved. The positioning structure according to the present disclosure is provided for the optomechanical to be assembled directly using the clamping method. No other jointing means is required during the assembling process. Thereby, the easiness and speed of assembling as well as disassembling can be enhanced. Because there is no destructive disassembly in the disassembling process, damages in the optomechanical module or the touch glass can be avoided. Consequently, the optomechanical module and the touch glass can be reused.

Accordingly, the present disclosure conforms to the legal requirements owing to its novelty, nonobviousness, and utility. However, the foregoing description is only embodiments of the present disclosure, not used to limit the scope and range of the present disclosure. Those equivalent changes or modifications made according to the shape, structure, feature, or spirit described in the claims of the present disclosure are included in the appended claims of the present disclosure.

The invention claimed is:

1. A positioning structure for touch display device, configured to position an optomechanical module to a touch glass, and comprising two positioning members disposed symmetrically at a corner of said touch glass, one of said positioning member is disposed on a first side and the other said positioning member is disposed on a second side, said corner is formed between said first side and said second side; each positioning member having a fixing part and a clamping part, said clamping part is integrated with said fixing part, and said clamping part opposite to each other and forming an accommodating space for disposing said optomechanical module;

wherein said fixing part includes a first fixing sheet having a fixing space and a second fixing sheet parallel with and spaced apart from said first fixing sheet; said fixing part is disposed at one of the first side and the second side of said touch glass; and said touch glass is accommodated in said fixing space, said first fixing sheet is located on a first surface of said touch glass and said first surface is a touch surface, one end of said first fixing sheet is connected with one end of said second fixing sheet; and fixing space is formed between said first fixing sheet and said second fixing sheet;

wherein said clamping part has a clamping sheet, said clamping sheet is connected to said first fixing sheet to form a ladder shaped and a clamping groove.

2. The positioning structure of claim 1, wherein each said clamping part is connected to one side of said first fixing sheet and located on said first surface.

3. The positioning structure of claim 1, wherein said optomechanical module has two wing parts clamped to said two clamping grooves of said two positioning members, respectively, and said optomechanical module is accommodated in said accommodating space.

4. The positioning structure of claim 1, and further comprising two clipping member clipping said two fixing parts of said two positioning members, respectively.

5. The positioning structure of claim 4, wherein said clipping member includes: a first clipping sheet; and a second clipping sheet, parallel with and spaced apart from said first clipping sheet, one end of said first clipping sheet connecting with one end of said second clipping sheet for forming a clipping space between said first clipping sheet and said second clipping sheet, said first clipping sheet and said second clipping sheet clipping said fixing part, and said fixing part located in said clipping space.

6. The positioning structure of claim 5, wherein said first clipping sheet is located on said first fixing sheet; said first fixing sheet has a first buckle part; said first clipping sheet has a second buckle part; and said first buckle part and said second buckle part buckle to each other.

7. The positioning structure of claim 1, and further comprising a connecting sheet, connecting said two fixing parts of said two positioning members, and making the width of said accommodating space equal to the width of said optomechanical module.

8. The positioning structure of claim 4, and further comprising a connecting sheet, connecting said two fixing parts of said two positioning members, and making the width of said accommodating space equal to the width of said optomechanical module.

9. The positioning structure of claim 1, wherein in an extending direction of said first side departs from said second side forming a cut angle at said corner, and a third side is formed and connected with between the first side and second side.

* * * * *